United States Patent
Gaur et al.

(10) Patent No.: US 9,251,181 B2
(45) Date of Patent: Feb. 2, 2016

(54) DYNAMIC MAP TEMPLATE DISCOVERY AND MAP CREATION

(75) Inventors: Nitin Gaur, Round Rock, TX (US); Todd E. Kaplinger, Raleigh, NC (US); Kulvir Singh Bhogal, Fort Worth, TX (US); Douglas Berg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 13/525,665

(22) Filed: Jun. 18, 2012

(65) Prior Publication Data
US 2013/0339392 A1 Dec. 19, 2013

(51) Int. Cl.
*G06F 17/30* (2006.01)

(52) U.S. Cl.
CPC .... *G06F 17/30292* (2013.01); *G06F 17/30501* (2013.01)

(58) Field of Classification Search
CPC .................. G06F 17/30241; G06F 17/30292
USPC ...................... 707/792, 999.1, 791
See application file for complete search history.

(56) References Cited

U.S. PATENT DOCUMENTS

| | | | |
|---|---|---|---|
| 6,141,731 A | 10/2000 | Beardsley et al. | |
| 6,370,622 B1 * | 4/2002 | Chiou et al. | 711/146 |
| 7,143,340 B2 | 11/2006 | Brid | |
| 7,366,978 B1 * | 4/2008 | Jones et al. | 715/227 |
| 8,087,066 B2 | 12/2011 | Belgaied et al. | |
| 8,352,524 B2 * | 1/2013 | Flake et al. | 700/17 |
| 8,364,802 B1 * | 1/2013 | Keagy et al. | 709/223 |
| 8,401,994 B2 * | 3/2013 | Hoang et al. | 707/609 |
| 8,495,177 B2 | 7/2013 | Carls et al. | |
| 8,576,218 B2 * | 11/2013 | Martinez et al. | 345/418 |
| 8,635,351 B2 * | 1/2014 | Astete et al. | 709/229 |
| 8,656,018 B1 * | 2/2014 | Keagy et al. | 709/226 |
| 8,666,960 B2 * | 3/2014 | McCormack et al. | 707/705 |
| 8,776,050 B2 * | 7/2014 | Plouffe et al. | 718/1 |
| 8,805,984 B2 * | 8/2014 | Markus et al. | 709/223 |
| 8,826,289 B2 * | 9/2014 | Muller | 718/104 |
| 8,832,020 B2 * | 9/2014 | Landy et al. | 707/602 |
| 8,838,593 B2 * | 9/2014 | Apanowicz et al. | 707/736 |
| 2002/0049702 A1 * | 4/2002 | Aizikowitz et al. | 707/1 |
| 2003/0140308 A1 | 7/2003 | Murthy et al. | |
| 2004/0193699 A1 * | 9/2004 | Heymann et al. | 709/218 |
| 2005/0198303 A1 | 9/2005 | Knauerhase et al. | |
| 2007/0067575 A1 | 3/2007 | Morris et al. | |
| 2007/0198741 A1 | 8/2007 | Duffy et al. | |
| 2007/0288224 A1 | 12/2007 | Sundarrajan et al. | |

(Continued)

OTHER PUBLICATIONS

Anonymous Author, Method and apparatus for location aware ObjectMap filter in IMDG, IP.com, IPCOM000211205D, Sep. 27, 2011, IBM (3 pages).

(Continued)

*Primary Examiner* — Miranda Le
(74) *Attorney, Agent, or Firm* — Charles L. Moore; Moore & Van Allen PLLC

(57) ABSTRACT

A method, system and computer program product for dynamic map template discovery and map creation may include determining a frequency of use of a data object in a database and discovering a dynamic map template corresponding to the data object based on the frequency of use of the data object. The method may also include creating a dynamic map from the dynamic map template in response to discovering the dynamic map template.

11 Claims, 3 Drawing Sheets

(56) References Cited

U.S. PATENT DOCUMENTS

| | | | |
|---|---|---|---|
| 2008/0133456 A1 | 6/2008 | Richards et al. | |
| 2008/0201206 A1* | 8/2008 | Pokorney et al. | 705/10 |
| 2008/0227440 A1* | 9/2008 | Settepalli | 455/418 |
| 2010/0070709 A1* | 3/2010 | Mekhiel | 711/122 |
| 2010/0235831 A1* | 9/2010 | Dittmer | 718/1 |
| 2011/0138123 A1* | 6/2011 | Gurajada et al. | 711/118 |
| 2011/0296298 A1* | 12/2011 | Ahuja et al. | 715/248 |
| 2011/0314060 A1* | 12/2011 | Sinha et al. | 707/779 |
| 2012/0089980 A1* | 4/2012 | Sharp et al. | 718/1 |
| 2012/0095834 A1* | 4/2012 | Doig et al. | 705/14.53 |
| 2012/0124100 A1* | 5/2012 | Schabenberger et al. | 707/802 |
| 2012/0158723 A1 | 6/2012 | Wu et al. | |
| 2012/0246170 A1* | 9/2012 | Iantorno | 707/748 |
| 2012/0246202 A1* | 9/2012 | Surtani et al. | 707/812 |
| 2012/0254200 A1* | 10/2012 | Lifshitz et al. | 707/752 |
| 2012/0297145 A1* | 11/2012 | Castillo et al. | 711/138 |
| 2013/0151502 A1* | 6/2013 | Yoon et al. | 707/714 |
| 2013/0166534 A1* | 6/2013 | Yoon et al. | 707/714 |
| 2013/0218930 A1* | 8/2013 | Wood et al. | 707/803 |
| 2013/0262443 A1 | 10/2013 | Leida et al. | |

OTHER PUBLICATIONS

USPTO; Non-Final Office Action for U.S. Appl. No. 13/907,361 dated Oct. 20, 2015, 26 Pages.

* cited by examiner

DYNAMIC MAP TEMPLATE DISCOVERY AND MAP CREATION

BACKGROUND

Aspects of the present invention relate to data storage and retrieval, and more particularly to a method, system and computer program product for dynamic map template discovery and map creation in an in memory data grid or similar data storage arrangement.

In memory data grids (IMDG) are used in conjunction with databases to store data that is more frequently used or requested. The more frequently used or accessed data in the IMDG enables faster data access as the data is accessed from memory rather than from the database and also reduces stress on the database. However, IMDG usage is innately limited by the amount of data that can be stored in the IMDG. The loading of data into the IMDG is restricted to a static model where the end user determines the data that needs to be loaded into the IMDG. There are instances where in the case of a very large database it is not economical to load all the data into the IMDG. IMDG elasticity of infrastructure may be addressed with a mechanism that involves manually adding a map and re-initializing the IMDG. However, re-initialization of the IMDG can be disruptive to users accessing data. Additionally, a complete IMDG re-initialization can result in data being lost which may require that appropriate backup strategies be implemented.

BRIEF SUMMARY

According to one aspect of the present invention, a method for dynamic map template discovery and map creation may include determining a frequency of use of a data object in a database and discovering a dynamic map template corresponding to the data object based on the frequency of use of the data object. The method may also include creating a dynamic map from the dynamic map template in response to discovering the dynamic map template.

According to another aspect of the present invention, a system for dynamic map template discovery and map creation may include a server and an in memory data grid associated with the server. A plurality of virtual machines may be stored in the in memory data grid and a dynamic map may be associated with each virtual machine. The system may also include a dynamic map discovery engine to determine if a requested map to access particular data corresponds to one of the dynamic maps.

According to a further aspect of the present invention, a computer program product for dynamic map template discovery and map creation may include may include a computer readable storage medium having computer readable program code embodied therewith. The computer readable program code may include computer readable program code configured to determine a frequency of use of a data object in a database. The computer readable program code may also include computer readable program code configured to discover a dynamic map template corresponding to the data object based on the frequency of use of the data object. The computer readable program code may additionally include computer readable program code configured to create a dynamic map from the dynamic map template in response to discovering the dynamic map template.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
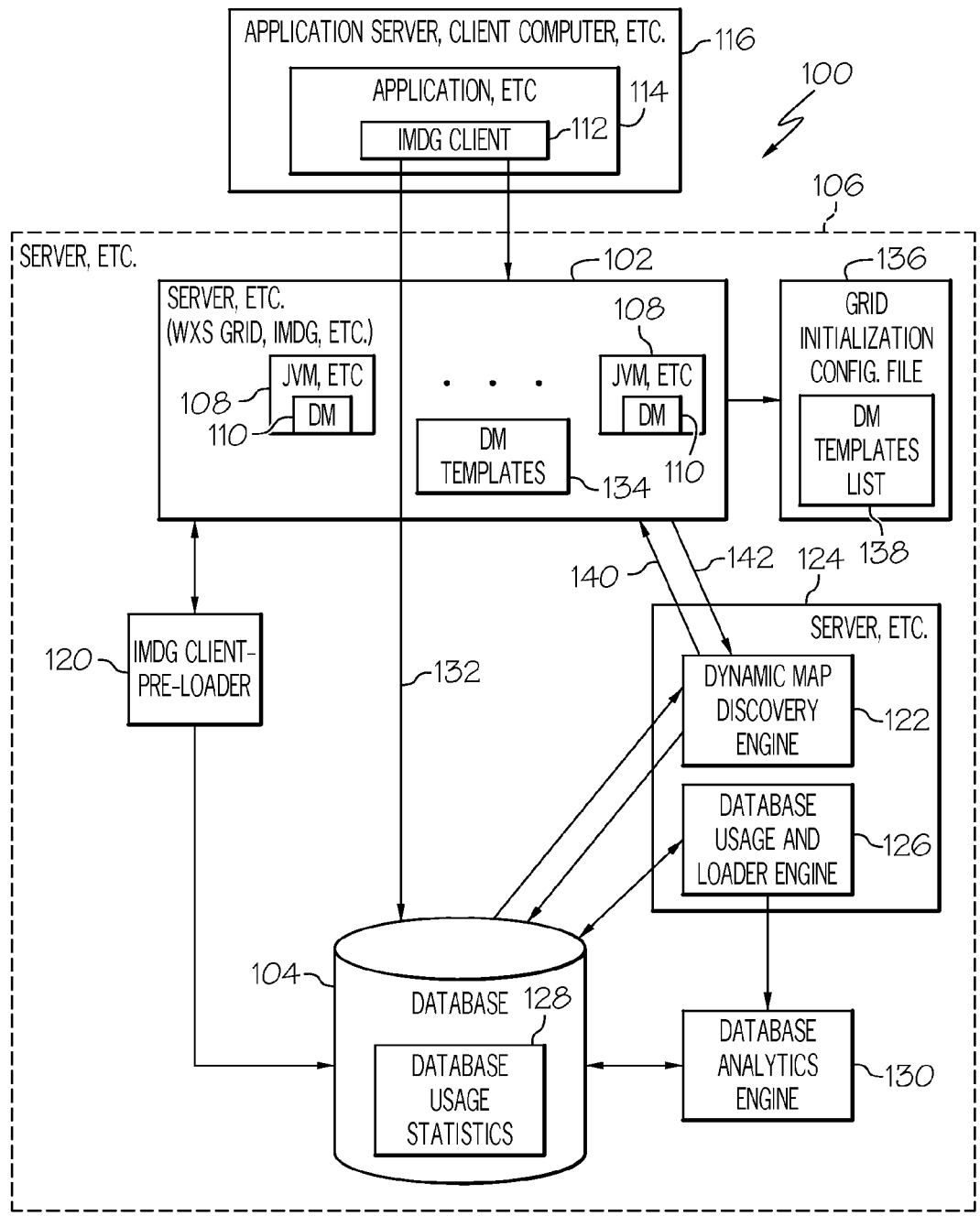
FIG. 1 is a block schematic diagram of an example of a system for dynamic map template discovery and map creation in accordance with an aspect of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with an aspect of the invention, a determination for proper placement of persisted data on a storage device or caching appliance may be performed taking into account the performance features of each of a plurality of shards or data storage units or entities on the storage device. The determination of the proper placement of the persisted data may take into account predetermined characteristics associated with the data and any requirements of a Service Level Agreement (SLA), such as levels or degrees of persistence, access speeds, throughput and other performance characteristics. Caching appliances and other data storage devices may provide various levels of persistence ranging from in memory only (RAM, etc.) to persisting to a disk or hard drive. Each of these various data storage units or components has an associated cost whether in terms of the actual cost to purchase the storage unit to speed of accessing the data and various combinations of such cost in between. Runtime characteristics of a running caching appliance may be leveraged to determine which model or combination of data storage units associated with a caching appliance or other storage device may best suit the data persistence and access requirements of an application along with the requirements of any SLA that may be associated with the application.

FIG. 1 is a block schematic diagram of an example of a system 100 for dynamic map template discovery and map creation in accordance with an aspect of the present invention. An IMDG 102 may be associated with a database 104 on a server 106 or other type data processing device. In another embodiment, the IMDG 102 may be on a different server at a different location from the database 104. The IMDG 102 may be a WebSphere eXtreme Scale (WXS) grid or other type IMDG. WebSphere is a trademark of the International Business Machines Corporation in the United States, other countries or both. The IMDG 102 may include a plurality of virtual machines 108, such as Java Virtual Machines (JVM) or other type virtual machines. Java is a trademark of Oracle America, Inc. in the United States, other countries or both. Each virtual machine 108 may include a dynamic map 110. Each dynamic map 110 may be associated with a set of data or data objects and may provide access to the data or data object when requested by a user or IMDG client 112. The dynamic maps 110 reduce the restriction of having to define all maps before initialization of the IMDG 102. The of dynamic map templates 134 are defined so the system can create maps after the ObjectGrid or IMDG 102 has been initialized, and so that when a new map or set of maps are needed, the grid or IMDG 102 does not need to be re-initialized. A new map can be created dynamically from a corresponding one of the map templates 134, hence the new map is a dynamic map.

Because the dynamic maps 110 can be created from map templates 134, and because the dynamic maps 110 can be created on any or every JVM 108 in the IMDG 102 the templates themselves may reside in every JVM 108. Unless via configuration or programmatically the dynamic map or maps are require to partner with another map or set of maps for efficient access. As discussed in more detail herein, a database analytics engine 130 may determine the most frequently used data, because the request for data not in the grid will only come to the database 104 when data is not in the IMDG 102 or grid. The database analytics engine 130 works with a database usage and loader engine 126 to load the data into the IMDG 102 and map meta data is provided by a map discovery engine 122 so the database usage and loader engine 126 can load the data on the IMDG 102. Each of the virtual machines 108 and associated dynamic maps 110 may be associated with a frequently used or requested set of data or data object. Each dynamic map 110 may contain a different set of frequently requested, used or accessed data or data objects.

The IMDG client 112 may be any client or entity that interacts with the IMDG 102. The IMDG client 112 may be associated with a application 114, client application or computer program. The application 114 may operate on an application server 116, client computer system or other data processing device. The IMDG client 112 may perform create, read, update and delete (CRUD) operations in the IMDG 102 and the IMDG 102 on behalf of a client application 114 may update the backend database 104. This update may be a write through or write behind operation.

If the IMDG 102 is used as a complete cache, the IMDG 102 should hold substantially all of the data and be loaded before any clients or applications connect to the IMDG 102. If the IMDG 102 is used as a sparse cache, the IMDG 102 should contain at least some data so that clients or applications may have immediate access to data when the clients connect to the IMDG 102.

In the case of very large databases, loading substantially all the data into the IMDG 102 may not be economical or practical. Under such circumstances, a user may pre-load selective data that may be expected to be frequently requested or used into the IMDG 102. For data not pre-loaded in the IMDG 102, an IMDG client-pre-loader 120 or loader plug-in may act as a data access layer to fetch or collect any frequently requested data from the database 104 and cache this data in the IMDG 102. Frequently requested data may be defined as any data or data object which is used, requested or accessed a set number of times or frequency that exceeds a predetermined threshold or is accessed a preset number of times over a selected time duration.

The system 100 may also include a dynamic map discovery engine 122. The dynamic map discovery engine 122 may operate on the server 106 or may operate on a separate server 124 or computing device from the server 106. As described in more detail herein, the dynamic map discovery engine 122 may perform a map discovery operation of the IMDG 102. Additionally, the dynamic map discovery engine 112 may query a plurality of dynamic map templates 134 and may operate with a mechanism, such as a database usage and loader engine 126 to determine frequently used data or data objects in the database 104 that may be subsequently loaded into the IMDG 102. The database usage and loader engine 126 can analyze database usage statistics 128. For example, the database usage and loader engine 126 may analyze a plurality of tables, columns and rows in the database 104 to determine the data or data objects associated with those tables, columns and rows that may be heavily or frequently used, requested or accessed by a user or IMDG client 112 so that this heavily used data or data objects may be loaded into the IMDG 102. This feature provides that the database 104 is not constrained for resources and that the database 104 is able to offload the data that is most requested to the IMDG 102. Accordingly, the features of the present invention provide flexibility and are driven by usage intelligence in contrast to previous practices which were primarily driven by the client and application and were neither flexible nor driven by usage intelligence. The database usage and loader engine 126 may utilize or consult with a database analytics engine 130 to analyze the database usage statistics 128 to determine the most requested data.

Requests from applications for data or map requests for data or data objects that may be pre-defined to be in the IMDG 102 will go to the IMDG 102. If the request for data or a data object is not pre-defined to be in the IMDG 102, the request is made directly to the database 104 as illustrated by arrow 132.

Dynamic maps 110 in the IMDG 102 reduce the restriction of having to define all maps prior to initialization. Through the use of dynamic map templates 134, maps may be created after the IMDG 102 has been initialized. This avoids having to re-initialize the IMDG 102 which can be disruptive and cause loss of data as previously described. A grid initialization configuration file 136 may include a list 138 of dynamic map templates that define the dynamic map templates. Dynamic map template comparisons are run when a session requests a map that has not been previously defined. Accordingly, a comparison of a requested map for data may be compared to the dynamic map templates 134 in response to a session or application requesting a map that has not been previously defined. If a name of the requested map matches a regular expression of one of the plurality of dynamic map templates 134, a new dynamic map is created dynamically from the matching map template. The new dynamic map may be assigned the name of the requested map. The newly created dynamic map may inherit all of the settings of the matching dynamic map template as defined in the grid configuration file 136. Examples of the settings may include but is not necessarily limited to data fields (address), data types (string), etc. If the map template can accept three fields of string and two fields with long integer and the map requires two fields of string and one field of long integer, the map template may be used to create the dynamic map.

The dynamic map discovery engine 122 does an IMDG map discovery or search of the IMDG 102 for a matching map template and queries the dynamic map template. The IMDG 102 is a collection of JVMs 108 each containing a defined dynamic map 108. The dynamic map discovery engine 122 discovers what type of dynamic maps 108 are available and with what map templates 134. The dynamic map discovery engine 122 may then provide this information to the data usage and loader engine 126 to use the maps to load data into the IMDG 102. This operation is illustrated by arrow 140 in FIG. 1. The dynamic map discovery engine 122 may query the data to match a regular expression of the dynamic map template and loads the map into the IMDG 102 with help from the database usage and loader engine 126. This operation is illustrated by arrow 142 in FIG. 1. The database usage and loader engine 126 connects to the IMDG 102 and with information from the dynamic map discovery engine 122, the loader engine 126 loads the appropriate data from the database 104 into the dynamic map 110 which may have a matching dynamic map template 134. Database usage and loader engine 126 acts like the IMDG client pre-loader 120 and makes a connection between the IMDG 102 and the database 104. However, the data usage and loader engine 126 loads data into the IMDG 102 based on a trigger from the database analysis engine 130. The trigger being based on the usage of the data, such as the frequency of use of the data exceeding a predetermined threshold. The IMDG client-pre-loader 120 loads data based on requests from any JVM 108 in the IMDG 102. After the data is loaded in the IMDG 102, an application, such as application 114, may now access the IMDG 102 to find the data in the IMDG 102 associated with the request for data.

As previously discussed, the dynamic maps feature of the present invention employs dynamic map templates. The templates may be defined by adding a template Boolean to an Extensible Markup Language (XML) configuration for a backing map. Map names of the templates will be allowed to use regular expression type semantics. When a system requests a map for accessing data that has not been previously defined, the dynamic map discovery engine 122 checks for matches on all of the dynamic map templates 134. If one and only one match is found, a new map is created and configured as defined by the dynamic map template.

When dynamic map templates are being defined, the map names are verified to confirm that they are unique so that an application can match to only one of the dynamic map templates using the Session.getMap(StringmapName) method. If the getMap( ) method matches more than one map template pattern, an IllegalArgumentException exception results. As an example, a sample ObjectGrid XML file with a map template may be defined as follows:

```
<?xml version="1.0" encoding="UTF-8"?>
<objectGridConfig xmlns:xsi="http://www.w3.org/2001/XMLSchema-instance"
xsi:schemaLocation="http://ibm.com/ws/objectgrid/config ../objectGrid.xsd"
xmlns="http://ibm.com/ws/objectgrid/config">
<objectGrids>
<objectGrid name="accounting">
<backingMap name="payroll" readOnly="false" />
<backingMap name="templateMap.*" template="true"
```

-continued

```
pluginCollectionRef="templatePlugins" lockStrategy="PESSIMISTIC" />
</objectGrid>
</objectGrids>
<backingMapPluginCollections>
<backingMapPluginCollection id="templatePlugins">
<bean id="Evictor"
className="com.ibm.websphere.objectgrid.plugins.builtins.-
LFUEvictor" />
</backingMapPluginCollection>
</backingMapPluginCollections>
</objectGridConfig>
```

The previous XML file defines one map template and one non-template map. The name of the map template is a regular expression: templateMap.*. When the Session.getMap (String) method is called with a map name matching this regular expression, the application creates a new map. Configuration of a map template is required in order to create a new dynamic map. Adding the template Boolean to a backingMap in the ObjectCreated XML file provides:
<backingMap name="templateMap.*" template="true" />
The name of the map template is treated as a regular expression.

Accordingly, the dynamic map feature of the present invention allows a plurality of dynamic map templates to be defined. The dynamic map discovery engine 122 discovers these map templates in response to a request for data and triggers the database usage and grid loader engine 126 to load data corresponding to the request into a dynamic map created from a matching dynamic map template. The dynamic maps are essentially the building blocks of the IMDG 102 and receptacles for data or data objects. The dynamic map template corresponds to an empty container that may be loaded or populated with the requested data. The dynamic map template becomes a dynamic map (or the dynamic map is created from the dynamic map template) containing frequently accessed or used data for responding to future data requests or map requests from an application.

The layout and design illustrated in FIG. 1 is for purposes of explaining the present invention and the present invention is not limited to any particular design.

Figure 2:
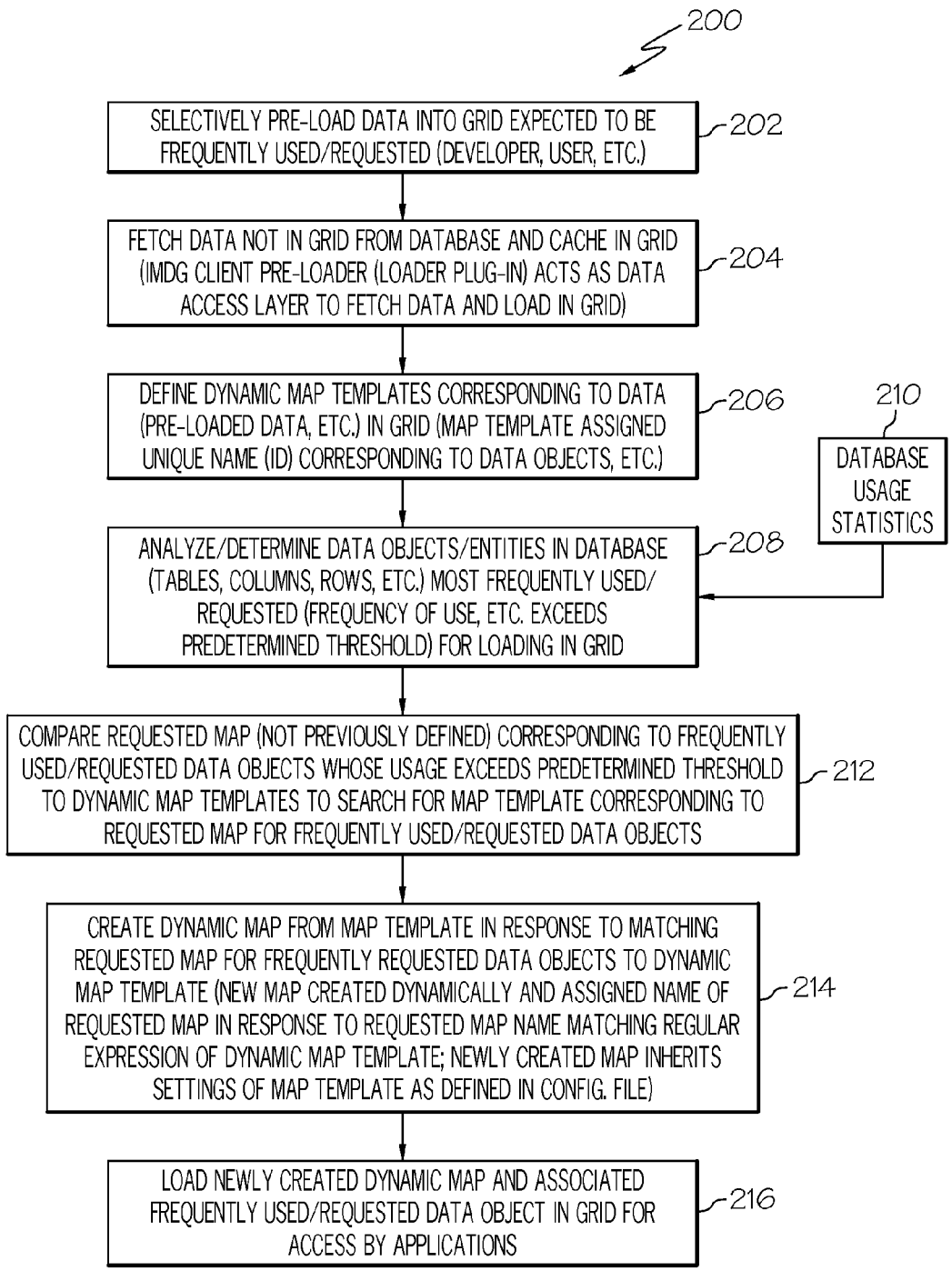
FIG. 2 is flowchart of an example of a method for dynamic map template discovery and map creation in accordance with an aspect of the present invention.

FIG. 2 is flowchart of an example of a method 200 for dynamic map template discovery and map creation in accordance with an aspect of the present invention. The method 200 may be embodied in and performed by the system 100 in FIG. 1. In block 202, data or data objects expected to be frequently used, requested or accessed may be selectively pre-loaded into an in memory data grid or simply IMDG or grid, such as IMDG 102 in FIG. 1. The data or data objects may be selectively pre-loaded by a user or developer of a database system that incorporates the grid.

In block 204, data not in the grid may be fetched or retrieved directly from a database and cached in the grid. An IMDG client pre-loader, loader plug-in or similar mechanism may act as a data access layer to retrieve the data and load the data in the grid.

In block 206, dynamic map templates corresponding to the data in the grid may be defined. The map template is assigned a unique name or ID that may correspond to or identify a type of data or data objects or other characteristics of the data that may be loaded into a dynamic map created from the map template.

In block 208, database usage statistics 210 may be analyzed to determine the most frequently used, requested or accessed data objects or entities in a database for loading in the grid. Statistical data related to a frequency of access to data in certain tables, columns and rows in the database may be analyzed to determine data usage corresponding to the table, columns and rows. A determination may be made if a frequency of use of particular data objects corresponding to certain tables, columns and rows exceeds a predetermined threshold. If the frequency of use exceeds the predetermined threshold, the corresponding data may be loaded in the grid for more efficient access.

In block 212, a requested map for particular data may be received. The requested map is compared to a plurality of dynamic map templates to search for a map template corresponding to the requested map. The dynamic map template comparison is run in response to the requested map corresponding to a frequently used or requested data object whose usage exceeds a predetermined threshold and which has not previously been defined as a dynamic map. The comparison may be performed by matching a name of the requested map to a regular expression of each map template to match the name of the requested map to the regular expression of one of the plurality of dynamic map templates.

In block 214, a dynamic map may be created in response to matching the requested map to one of the dynamic map templates. The requested map is matched to one of the dynamic map templates by comparing the name of the requested map to the regular expression of the dynamic map templates for a match similar to that previously described. The new map is created dynamically from the matching dynamic map template and the map is assigned the name of the requested map. The newly created map inherits the settings of the map template as defined in a configuration file.

In block 216, the newly created dynamic map and associated frequently used or requested data or data object are loaded in the grid for access by an application that submitted the map request The newly created dynamic map is stored in the grid or IMDG and may be accessed by other applications.

Figure 3:
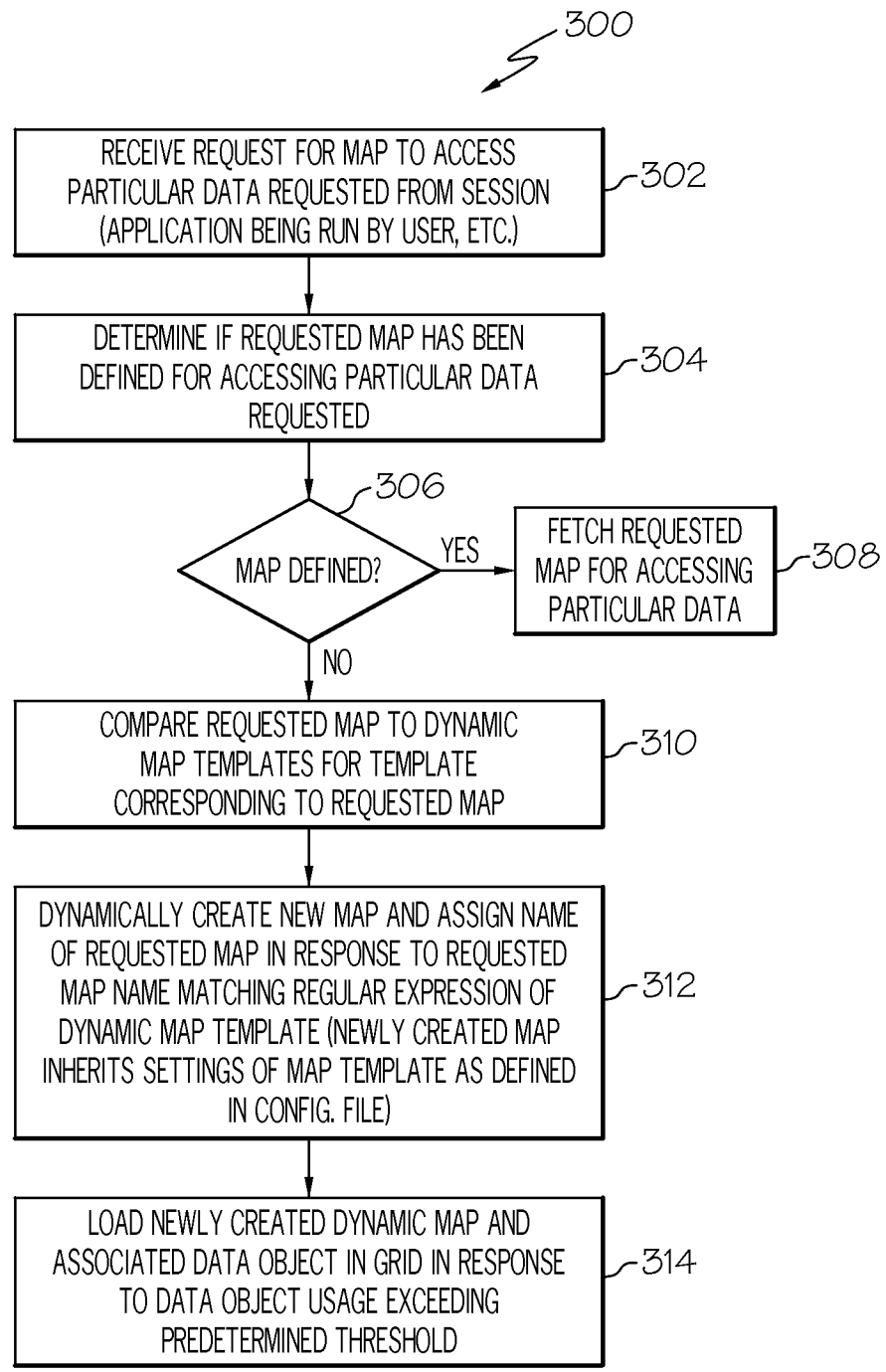
FIG. 3 is flowchart of an example of a method for dynamic map template discovery and map creation in accordance with another aspect of the present invention.

FIG. 3 is flowchart of an example of a method 300 for dynamic map template discovery and map creation in accordance with another aspect of the present invention. The method 300 may be embodied in and performed by the system 100 of FIG. 1. In block 302, a request for a map to access particular data may be received from a session or application being run on an application server or by a user on a computer system.

In block 304, a determination may be made if the requested map has been defined for accessing particular data. In block 306, if a map has been defined for the particular data requested, the method 300 may advance to block 308 and the requested map for accessing the particular data may be fetched or retrieved.

If a map has not been defined in block 306 for accessing particular data requested, the method 300 may advance to block 310. In block 310, the requested map may be compared to a plurality of dynamic map templates for a map template corresponding to the requested map. As previously discussed, the comparison may involve matching a name of the requested map to a regular expression of one of the plurality of dynamic map templates.

In block 312, a new map may be dynamically created in response to finding a match between the requested map and one of the plurality of dynamic map templates. The new dynamically created map may be assigned the name of the requested map and may acquire or inherit the settings of the map template as defined in a configuration file.

In block 314, the newly created dynamic map and associated data or data object may be loaded in the grid in response to the data object usage exceeding a predetermined threshold.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A computer program product for dynamic map template discovery and map creation, the computer program product comprising:

a non-transitory computer readable storage medium having computer readable program code embodied therewith, the computer readable program code comprising:

computer readable program code configured to define a plurality of dynamic map templates in an in memory data grid before initialization of the in memory data grid;

computer readable program code configured to initialize the in memory data grid;

computer readable program code configured to determine a frequency a data object stored in a database has been requested or accessed;

computer readable program code configured to discover a dynamic map template, that corresponds to a requested map for the data object, from the plurality of dynamic map templates, wherein the dynamic map template corresponding to the requested map is discovered in response to the frequency the data object has been requested or accessed exceeding a predetermined threshold and the requested map for the data object not being in the in memory data grid;

computer readable program code configured to compare the requested map to the plurality of dynamic map templates for the map template corresponding to the requested map in response to the requested map not being discovered in the in memory data grid by a dynamic map discovery engine, wherein discovering the dynamic map template from the plurality of dynamic map template comprises matching a name of the requested map to a regular expression of one of the plurality of dynamic map templates;

computer readable program code configured to create a new dynamic map from the dynamic map template in response to discovering the dynamic map template, wherein the new dynamic map provides access to the data object, the new dynamic map being created from the dynamic map template in the in memory data grid so that the in memory grid is not reinitialized causing disruption of use of the in memory data grid;

computer readable program code configured to assign the name of the requested map to the new dynamic map;

computer readable program code configured to load the new dynamic map on a virtual machine in the in memory data grid; and computer readable program code configured to load the data object in the in memory data grid from the database and associate the new dynamic map with the data object in the in memory data grid.

2. The computer program product of claim 1, further comprising:

computer readable program code configured to receive a request for a map to access particular data;

computer readable program code configured to determine if the requested map exists in the in memory data grid for accessing the particular data requested; and computer readable program code configured to fetch the requested map for accessing the particular data in response to the requested map being discovered in the in memory data grid by a dynamic map discovery engine.

3. A system for dynamic map template discovery and map creation, comprising:

a processor;

an in memory data grid;

a module operable on the processor configured for:

defining a plurality of dynamic map templates in the in memory data grid before initialization of the in memory data grid;

initialization of the in memory data grid;

determining a frequency a data object stored in a database has been requested or accessed;

discovering a dynamic map template, that corresponds to a requested map for the data object, from the plurality of dynamic map templates, wherein the dynamic map template corresponding to the requested map is discovered in response to the frequency the data object has been requested or accessed exceeding a predetermined threshold and the requested map for the data object not being in the in memory data grid;

comparing the requested map to the plurality of dynamic map templates for the map template corresponding to the requested map in response to the requested map not being discovered in the in memory data grid by a dynamic map discovery engine, wherein discovering the dynamic map template from the plurality of dynamic map template comprises matching a name of the requested map to a regular expression of one of the plurality of dynamic map templates;

creating a new dynamic map from the dynamic map template in response to discovering the dynamic map template, wherein the new dynamic map provides access to the data object, the new dynamic map being created from the dynamic map template in the in memory data grid so that the in memory data grid is not reinitialized causing disruption of use of the in memory data grid; and assigning the name of the requested map to the new dynamic map;

loading the new dynamic map on a virtual machine in the in memory data grid; and loading the data object in the in memory grid from the database and associating the new dynamic map with the data object in the in memory data grid.

4. The system of claim 3, wherein discovering the dynamic map template comprises searching for the dynamic map template in response to the frequency of use of the data object exceeding the predetermined threshold.

5. The system of claim 3, further comprising:
a module for analyzing database usage statistics to determine if the frequency of use of the data object exceeds the predetermined threshold.

6. The system of claim 5, wherein the module for analyzing the database usage statistics comprises a module for analyzing a frequency of access to a plurality of tables, columns and rows in the database.

7. The system of claim 3, further comprising a module for performing a dynamic map discovery of maps in the in memory data grid in response to receiving a request for a map to access particular data.

8. The system of claim 3, further comprising:
a module for receiving a request for a map to access particular data; and
a module for determining if the requested map exists in the in memory data grid for accessing the particular data requested.

9. The system of claim 8, further comprising a module for fetching the requested map for accessing the particular data in response to the requested map being discovered in the in memory data grid by a dynamic map discovery engine.

10. The system of claim 3, wherein the new dynamic map inherits the setting of the one of the dynamic map templates.

11. The system of claim 3, further comprising a plurality of virtual machines contained in the in memory data grid, wherein the plurality of dynamic map templates resides on each virtual machine in the in memory data grid.

* * * * *